United States Patent [19]

Fujimoto et al.

[11] 4,228,255
[45] Oct. 14, 1980

[54] METHOD FOR PRODUCING CROSSLINKED POLYETHYLENES

[75] Inventors: Ikuo Fujimoto; Setsuya Isshiki; Yoshikazu Kurita; Yoji Sato, all of Tokyo, Japan

[73] Assignee: The Fujikura Cable Works Ltd., Tokyo, Japan

[21] Appl. No.: 53,108

[22] Filed: Jun. 28, 1979

Related U.S. Application Data

[63] Continuation of Ser. No. 859,693, Dec. 12, 1977, abandoned.

[30] Foreign Application Priority Data

Dec. 14, 1976 [JP] Japan .................................. 51-150190
Dec. 7, 1977 [JP] Japan .................................. 52-83206

[51] Int. Cl.³ ............................................. C08L 43/04
[52] U.S. Cl. ................................ 525/288; 264/176 R; 525/245; 525/248; 525/260; 525/262; 525/263
[58] Field of Search .......................................... 525/288

[56] References Cited

U.S. PATENT DOCUMENTS 3,936,523  2/1976  Kleeberg et al. ..................... 525/281
4,058,583  11/1977  Glander et al. ................. 204/159.13

Primary Examiner—Wilbert J. Briggs, Sr.
Attorney, Agent, or Firm—Toren, McGeady and Stanger

[57] ABSTRACT

A novel method for crosslinking a polyolefin comprising reacting a polyolefin, which is a low density polyethylene having a density less than 0.93 and melt index of 0.1–0.5 g/10 min. or a polyolefin mixture containing a low density polyethylene having a density less than 0.93 as major component, with an organic silane and a free radical generating compound to form a silane-grafted polyolefin, then mixing silane-grafted polyolefin with a silanol condensation catalyst, and heating them. According to this method, the crosslinking takes place concurrently with forming by extrusion, and a shaped article having a high degree of crosslinking with smooth surface is obtained. The method according to this invention is especially suited for covering electrical wires with polyolefin.

9 Claims, No Drawings

METHOD FOR PRODUCING CROSSLINKED POLYETHYLENES

This is a continuation of application Ser. No. 859,693, filed Dec. 12, 1977, now abandoned.

BACKGROUND OF THE INVENTION

It has been known in the art from U.S. Pat. No. 3,646,155 etc. to produce a cross-linked polyethylene by reacting a polyethylene with a free radical generating compound and an organic silane having the general formula $RR'SiY_2$ (wherein R represents a monovalent olefinically unsaturated hydrocarbon or hydrocarbonoxy radical, each Y represents a hydrolyzable organic radical and R' is a monovalent hydrocarbon radical except aliphatically unsaturated hydrocarbon radicals, or is a Y radical) to form a silane-grafted polyethylene, and subjecting said silane-grafted polyethylene to action of warm water or steam in the presence of a silanol condensation catalyst to obtain a crosslinked polyethylene. According to the prior technical concept, no polyethylene having a greater degree of crosslinking would be produced by merely heating a silane-grafted polyethylene in the presence of a silanol condensation catalyst. Thus, it has been common in the prior art to adopt a process that a silane-grafted polyethylene is mixed with a silanol condensation catalyst followed by being molded with heating, and the resulting shape is soaked in a warm aqueous bath or a steam chamber to crosslink. Otherwise, there has been practiced a process wherein a sinane-grafted polyethylene is added with a silanol condensation catalyst and water, the resulting mixture is fed to an extruder, and the crosslinking takes place simultaneously with shaping by extrusion. However, the former process has the drawback that a warm aqueous bath or a steam chamber is required to install and, additionally, the step of contacting the extruded article with warm water or steam must be manually operated to increase the cost of production. The latter process also has drawbacks in that the moisture fed to the extruder forms bubbles of steam which emerge on the surface of the extrudate and a poor extruded article having a high surface roughness is obtained. In some cases where the resin is crosslinked to a certain extent by the heat generated in course of shaping in the extruder, the resin unfavorably cannot melt to flow and the extrudate cannot be obtained.

SUMMARY OF THE INVENTION

This invention relates to a method for cross-linking polyethylenes. More particularly, this invention relates to a novel method for producing crosslinked polyolefins from low density polyethylenes or mixtures of polyolefins having a low density polyethylene as major component.

As a result of intensive and extensive studies by the present inventors to remove aforementioned drawbacks of the prior art, it has been found that, when a silane having the general formula described hereinbefore is grafted onto a polyolefin as defined hereinafter, which is a low density polyethylene having a density less than 0.93 and a melt index within the range considered as inappropriate in the prior art, or polyolefin mixture consisting of a low density polyethylene having a density less than 0.93 as major component and a high density polyethylene or a polypropylene, and the resulting silane-grafted polyolefin is shaped with a machine such as extruder after mixed with a silanol condensation catalyst, a high degree of crosslinking is effected in the product merely by virtue of the heat generated and the time elapsed during shaping, without exposing to moisture. Although the product is highly crosslinked, fluidity necessary for shaping is maintained and the shaped article has a smooth surface.

It is a primary object of this invention to provide a method for crosslinking a polyethylene composition wherein said polyethylene composition can be highly crosslinked merely by the heat generated during shaping, while at the same time the fluidity necessary to shaping is maintained, the resulting shaped article having a smooth surface.

Another object of this invention is to provide a method for producing a crosslinked polyethylene which does not require a special installation, such as an equipment for continuous heat-crosslinking operation, an equipment for crosslinking with electron beams, or a warm water trough.

The foregoing and other objects are achieved by the method for crosslinking a polyethylene in accordance with this invention. The gist of this invention is a method for producing a crosslinked polyolefin which is characterized by comprising reacting a polyolefin as defined hereinafter, such as a low density polyethylene having a density less than 0.93 and a melt index of 0.1–0.5 g/10 min. or a polyolefin mixture containing a low density polyethylene having a density less than 0.93 as major component, with a free radical generating compound and an organic silane having the general formula $RR'SiY_2$, wherein R represents a monovalent olefinically unsaturated hydrocarbon or hydrocarbonoxy radical, each Y represents a hydrolyzable organic radical, and R' represents a monovalent hydrocarbon radical except aliphatically unsaturated hydrocarbon radicals, or a Y radical, to form a silane-grafted polyolefin, mixing them said silane-grafted polyolefin with a silanol condensation catalyst, and heatin them.

DETAILED DESCRIPTION

In the prior art, the starting material polyethylene for a process which comprises subjecting a silane-grafted polyethylene from said polyethylene to actions of a silanol condensation catalyst and warm water or steam to form a crosslinked polyethylene should have melt index of at least 2.0 g/10 min., as can be seen in the specification of U.S. Pat. No. 3,646,155. By way of contrast, the present inventors have found that a crosslinked polyolefin including polyethylene can be obtained without exposing to an action of warm water and steam, whenever a member of polyolefin compositions of groups (A), (B) and (C) as defined hereinafter is employed as starting material.

In a process for crosslinking a polyethylene by way of mixing a silane-grafted polyethylene with a silanol condensation catalyst, the main technical difficulty lies in a competition between the degree of crosslinking and the extrudability. When the crosslinking is effected in a high degree, the extrusion becomes difficult and the extrudate, if possible, has a surface roughness. To overcome this difficulty, the melt index of the starting material is limited to at least 2.0 g/10 min. in the process of the invention described in U.S. Pat. No. 3,646,155. However, when a low density polyethylene as starting material has a melt index of 2.0 or more, the gel content of the resulting crosslinked polyethylene goes up barely to a value about 50%, as can be seen in Example 8 described hereinafter. Accordingly, it was necessary for crosslinking in the prior art to bring the extrudate in contact with warm water or steam. As a result of intensive studies by the present inventors, it is found that even a polyethylene having a melt index below 0.2 g/10 min., which has been regarded as inappropriate starting material, can give an excellent product provided that said polyethylene has a melt index within the range of from 0.1 to 0.5 g/10 min. In addition, it is also found that a product having a degree of crosslinking of not less than 70% can be obtained without being contacting with warm water nor steam. On the one hand, if the starting polyolefin having a melt index less than 0.1 g/10 min. is employed, the viscosity of the mix is too high and the extrusion for shaping is difficult. On the other hand, in case of employing a starting polyolefin having a melt index more than 0.5 g/10 min., a product with smooth surface and high degree of crosslinking cannot be obtained.

As mentioned above, the degree of crosslinking is in competition with the extrudability and the compromise between them is usually difficult. However, it is found by the present invention that, when a polyolefin mixture consisting of a low density polyethylene having a density less than 0.93 and a polypropylene or a high density polyethylene having a density of 0.93 or more both in an amount of 15% by weight or below is employed as starting material, an extrudate which has an increased degree of crosslinking, e.g. 80%, and still has a good surface can be obtained. This means that said polyolefin mixture as starting material brings about a higher extrudability and a greater degree of crosslinking, as compared with a case of using solely a polyethylene having a density less than 0.93. Accordingly, when a crosslinked polyolefin having a maximum degree of crosslinking along with excellent surface is desired to obtain without treating with warm water etc., a polyolefin mixture having a melt index of 0.1 to 0.5 g/10 min. and consisting of a low density polyethylene having a density less than 0.93 and a polypropylene and/or a high density polyethylene in an amount not more than 15% by weight based on the total weight of the polyolefin mixture must be employed.

When the extrudability is considered preferentially, it is a common practice in the art to use a polyethylene having a melt index not less than 2.0 g/10 min. However, the gel content of the product which reveals the degree of crosslinking reaches some 50% at most, even by way of a silane-grafted polyethylene. When the extrudability is desired to improve while the gel content of 70% or more is maintained in the product, a polyethylene mixture consisting of a low density polyethylene having a high melt index and a density less than 0.93 in an amount of 50 to 99% by weight and a high density polyethylene having a density not less than 0.93 in an amount of 50 to 1% by weight is employed as starting material in accordance with this invention. Said mixture is converted to a silane-grafted polyethylene. The resulting silane-grafted polyethylene is mixed with a silanol condensation catalyst and the mixture is extruded with heating to obtain a crosslinked polyethylene.

Thus, a polyethylene or a polyolefin mixture to be used as starting material in the method of this invention is selected from the members of anyone of the following groups (A), (B) and (C):

group (A): low density polyethylenes having a density less than 0.93 and a melt index within the range of 0.1 to 0.5 g/10 min., group (B): polyolefin mixtures having a melt index of 0.1 to 0.5 g/10 min. and consisting of a low density polyethylene having a density less than 0.93 and a polypropylene and/or a high density polyethylene in an amount of not more than 15% by weight based on the total weight of the polyolefin mixture, and group (C): polyethylene mixtures consisting of a low density polyethylene having a density less than 0.93 in an amount of 50 to 99% by weight and a high density polyethylene having a density not less than 0.93 in an amount of 50 to 1% by weight.

The term "polyolefin" as used hereinafter refers to a member of anyone of the aforementioned groups (A), (B) and (C).

Organic silanes employable in the method of this invention have the general formula $RR'SiY_2$ wherein R represents a monovalent olefinically unsaturated hydrocarbon or hydrocarbonoxy radical. Examples of such radicals R are vinyl, allyl, butenyl, cyclohexenyl, cyclopentadienyl, cyclohexadienyl, $CH_2=C(CH_2)COO(CH_2)_3-$, $CH_2=C(CH_3)COOCH_2CH_2O(CH_2)_3-$ and $CH_2=C(CH_3)COOCH_2CH_2-OCH_2CH(OH)CH_2O(CH_2)_3-$. The vinyl radical is especially preferred among these radicals. Each Y represents any hydrolyzable organic radical and includes an alkoxy radical such as methoxy, ethoxy and butoxy radicals; and acyloxy radical such as formyloxy, acetoxy and propionoxy radicals; an oximo radical such as $-ON=C(CH_3)_2$, $-ON=C(CH_3)C_2H_5$ and $-ON=C(C_6H_5)_2$ radicals; an alkylamino radical such as $-NHC_2H_5$ radical; and an arylamino radical such as $-NH(C_6H_5)$ radical. Two Ys in the general formula may be similar or dissimilar radicals selected from the group mentioned above. R' represents a monovalent hydrocarbon radical except aliphatic unsaturated hydrocarbon radicals, such as methyl, ethyl, propyl, tetradecyl, octadecyl, phenyl, benzyl, and tolyl radicals, and R' can be one member of the group represented by Y.

Silanes having the formula $RSiY_3$ are especially preferred among empolyable silanes defined above. The preferred silanes are vinyltriethoxysilane, vinyltrimethoxysilane and mixtures thereof. The amount of an organic silane to be used may vary commonly from 1 to 10 parts by weight per 100 parts by weight of polyethylene or polyolefin mixture used. When an amount of silane less than one part by weight is employed, no sufficient crosslinking can be obtained. When an amount more than 10 parts by weight is employed, the molding can be hardly performed.

As the free radical generating compound in this invention there may be employed any compound which is capable of producing free radical sites in the polyolefin under the reaction condition and which has a half life at the reaction temperature of less than 6 minutes and preferably less than one minute. Examples of operable free radical generating compound include organic peroxides and peresters, such as benzoyl peroxide, dichlorobenzoyl peroxide, dicumyl peroxide, di-tert-butyl peroxide, 4,5-dimethyl-2,5-di(peroxy benzoate)hexyne-3, 1,3-bis(tert-butyl peroxy isopropyl)benzene, lauroyl peroxide, tert-butyl peracetate, 2,5-dimethyl-2,5-di(tert-butylperoxy)hexyne-3, 2,5-dimethyl2,5-di(tert-butylperoxy)hexane and tert-butyl perbenzoate. Azo compounds, such as azobisisobutyronitrile and dimethylazodiisobutyrate, are also operable. Dicumyl peroxide is the most preferred among these compounds. The amount of free radical generating compound to be employed is within the range of 0.0002 to 0.002 moles per 100 g of the polyolefin employed. An amount less than 0.0002 moles of free radical generator cannot give a sufficient degree of crosslinking, whereas an amount more than 0.002 moles can hardly permit the extrusion to take place.

Suitable materials for use as the silanol condensation catalyst of this invention include organo-metallic compounds such as dibutyltin dilaurate, stannous acetate, dibutyltin diacentate, dibutyltin dioctoate, lead naphthenate, zinc caprylate, cobalt naphthenate, tetrabutyl titanate, tetranonyl titanate, lead stearate, zinc stearate, cadmium stearate, barium stearate, and calcium stearate. The most preferred catalysts are the organic tin compounds for example, dibutyltin dilaurate, dibutyltin diacetate, and dibutyltin dioctoate. The aforesaid catalyst should be present in a quantity within the range of 0.05 to 0.5 parts by weight per 100 parts by weight of the silane-grafted polyolefin. When a quantity less than 0.05 parts by weight of the catalyst is employed, a lower degree of crosslinking is found in the product, whereas a quantity more than 0.5 parts by weight of the catalyst gives a product having a high surface roughness.

Crosslinked polyolefins produced according to this invention are characterized by containing a gel content of 70% or more and showing a deformation under load of 40% or less after having been heated. A gel content not less than 70% in the product is required in relation to the deformation under heat.

To practice the method of this invention, a polyolefin, which is selected from members of anyone of the groups (A), (B) and (C) as defined above as starting material of this invention, is reacted with vinyltrimethoxysilane, vinyltriethoxysilane, or the like at a temperature of 140° C. or higher in the presence of an aforementioned free radical generating compound to convert to a crosslinkable polyolefin, the resulting material is mixed with a silanol condensation catalyst and the mixture is shaped by means of an extruder and the like. A shaped article which has been highly crosslinked by virtue of the heat generated during shaping is obtained.

In this process, the gel content of the product depends on amounts used of the polyolefin, the organic silane, the free radical generating compound and the silanol condensation catalyst. Thus, the amounts of the substances to be used should be controlled so that the objects of shaping as well as the use of the product may be fulfilled. The operable amount of an organic silane is in the range of one to 10 parts by weight per 100 parts by weight of the starting polyolefin. As regards free radical generating compound, the operable amount is in the range of 0.0002 to 0.002 moles per 100 g of the polyethylene. The operable amount of a silanol condensation catalyst is in the range of 0.05 to 0.5 parts by weight per 100 parts by weight of the silane-grafted polyethylene.

Especially, when a polyolefin mixture is used as starting material, the gel content of the product depends upon the ratio of amounts of the components in the mixture. Accordingly, said ratio may be selected, depending on the purpose of shaping and the use of the product. In the case of a member of the aforementioned group (C) is used, the preferred ratio is of 95–70% by weight of a low density polyethylene to 5–30% by weight of a high density polyethylene.

The following examples are given by way of illustration and should not be considered limitative. Unless otherwise noted, all parts and percentages herein are by weight.

EXAMPLE 1

A solution of 0.3 parts by weight of dicumyl peroxide (abridged as DCP, hereinafter) dissolved in 4 parts by weight of vinyltrimethoxysilane (abridged as VTMOS, hereinafter) is dispersed in 100 parts by weight of a low density polyethylene having a density of 0.919 and a melt index of 0.1 g/10 min. The resulting mixture is extruded at an extrusion temperature of 200° C. to form a crosslinkable silane-grafted polyethylene, by means of an extruder provided with a 50 mm screw. 95 parts by weight of the obtained silane-grafted polyethylene are mixed with 5 parts by weight of a low density polyethylene (density 0.921, melt index 0.22 g/10 min.) containing 5% by weight of dibutyltin dilaurate, and the mix is extruded at a temperature of 170°–180° C. to form an insulation on an electrical wire. The surface of the covered wire is observed. The gel content of the insulation is determined by dissolving a part of the insulation in xylene at 120° C. taking 24 hours.

The same procedure is repeated, employing various low density polyethylenes having a density of 0.919 and a melt index in the range of 0.1 to 10 g/10 min. as starting material. The results are shown in Table 1 below.

When the surface of an extrudate feels smooth to the touch, such surface is denoted by the term "good", whereas the surface which feels rough is denoted by the term "poor".

TABLE 1

|  | This invention | | | Control | | |
|---|---|---|---|---|---|---|
|  | run 1 | run 2 | run 3 | run 4 | run 5 | run 6 |
| Low density polyethylene |  |  |  |  |  |  |
| Melt index (g/10 min.) | 0.1 | 0.2 | 0.5 | 0.7 | 2 | 10 |
| Amount (parts) | 100 | 100 | 100 | 100 | 100 | 100 |
| VTMOS (parts) | 4 | 4 | 4 | 4 | 4 | 4 |
| DCP (parts) | 0.3 | 0.3 | 0.3 | 0.3 | 0.3 | 0.3 |
| DBTDL (parts) | 0.25 | 0.25 | 0.25 | 0.25 | 0.25 | 0.25 |
| Surface of extrudate | good | good | good | poor | poor | poor |
| Gel content (%) | 76.6 | 76.3 | 76.8 | 76.3 | 76.7 | 76.6 |

As can be seen from Table 1 above, the surfaces of extrudates made from polyethylenes having a melt index more than 0.5 g/10 min. are poor. A test is run as control. A low density polyethylene having a density of 0.921 and a melt index of 0.22 g/10 min., which contains about 2% of DCP, is extruded. Although the gel content of the extrudate is determined to be 73.5%, the surface of the extrudate is observed to be remarkably rough, as compared with that of the extrudate according to this invention.

EXAMPLE 2

The procedure in Example 1 is repeated except that a sole low density polyethylene having a melt index of 0.2 g/10 min. is employed in all runs and the amount of VTMOS varies over the range of 0 to 20 parts by weight.

TABLE 2

|  | This invention | | | | Control | | | |
|---|---|---|---|---|---|---|---|---|
|  | run 1 | run 2 | run 3 | run 4 | run 5 | run 6 | run 7 | run 8 |
| Low density polyethylene (parts) | 100 | 100 | 100 | 100 | 100 | 100 | 100 | 100 |
| VTMOS (parts) | 2 | 4 | 8 | 10 | 0 | 12 | 15 | 20 |
| DCP |  |  |  |  |  |  |  |  |

TABLE 2-continued

|  | This invention | | | | Control | | | |
| --- | --- | --- | --- | --- | --- | --- | --- | --- |
|  | run 1 | run 2 | run 3 | run 4 | run 5 | run 6 | run 7 | run 8 |
| (parts) DBTDL | 0.3 | 0.3 | 0.3 | 0.3 | 0.3 | 0.3 | 0.3 | 0.3 |
| (parts) | 0.25 | 0.25 | 0.25 | 0.25 | 0.25 | 0.25 | 0.25 | 0.25 |
| Surface of extrudate | good | good | good | good | good | poor | poor | poor |
| Gel contents (%) | 73.7 | 76.3 | 79.7 | 90.3 | 0 | 90.8 | 91.8 | 91.2 |

It is ascertained by Table 2 above that a too small amount of vinyltrimethoxysilane cannot arouse crosslinking whereas a too large amount brings about a surface roughness of the extrudate.

EXAMPLE 3

The procedure of Example 1 is repeated with the differences being that a sole low density polyethylene having a melt index of 0.2 g/10 min. is employed and the amount of DCP varies over the range of 0 to 1 part by weight.

TABLE 3

|  | This invention | | | | Control | | | | |
| --- | --- | --- | --- | --- | --- | --- | --- | --- | --- |
|  | run 1 | run 2 | run 3 | run 4 | run 5 | run 6 | run 7 | run 8 | run 9 |
| Low density polyethylene (parts) | 100 | 100 | 100 | 100 | 100 | 100 | 100 | 100 | 100 |
| VTMOS (parts) | 4 | 4 | 4 | 4 | 4 | 4 | 4 | 4 | 4 |
| DCP (parts) | 0.05 | 0.1 | 0.3 | 0.5 | 0 | 0.01 | 0.7 | 0.8 | 1.0 |
| DBTDL (parts) | 0.25 | 0.25 | 0.25 | 0.25 | 0.25 | 0.25 | 0.25 | 0.25 | 0.25 |
| Surface of extrudate | good | good | good | good | good | good | poor | poor | poor |
| Gel content (%) | 43.6 | 65.7 | 76.3 | 90.4 | 0 | 30.2 | 90.4 | 90.5 | 90.9 |

When the amount of DCP is too small, the crosslinking is not effected sufficiently. When too large, the surface of the extrudate is poor.

EXAMPLE 4

The procedure as in Example 1 is repeated except that a sole low density polyethylene having a melt index of 0.2 g/10 min. is employed and the silane-grafted polyethylene is mixed with a series of low density polyethylenes containing an amount of 0 to 20% of DBTDL. The respective content of DBTDL after mixing varies over the range of 0 to 1 part by weight per 100 parts by weight of low density polyethylene.

TABLE 4

|  | This invention | | | Control | | |
| --- | --- | --- | --- | --- | --- | --- |
|  | run 1 | run 2 | run 3 | run 4 | run 5 | run 6 |
| Low density polyethylene (parts) | 100 | 100 | 100 | 100 | 100 | 100 |
| VTMOS (parts) | 4 | 4 | 4 | 4 | 4 | 4 |
| DCP (parts) | 0.3 | 0.3 | 0.3 | 0.3 | 0.3 | 0.3 |
| DBTDL (parts) | 0.05 | 0.25 | 0.5 | 0 | 0.75 | 1.0 |
| Surface of extrudate | good | good | good | good | poor | poor |
| Gel content (%) | 67.8 | 76.3 | 90.8 | 43.7 | 91.7 | 91.2 |

It can be seen from Table 4 above that a too small amount of DETDL gives a low degree of crosslinking whereas a too large amount makes the surface of the extrudate rough.

EXAMPLE 5

The procedure of Example 1 is repeated with polyethylene mixtures, which consist of a low density polyethylene having a density of 0.919 and a melt index of 0.2 g/10 min. and a high density polyethylene having a density of 0.968 and a melt index of 0.9 g/10 min., used as starting materials. A covered electrical wire is made, the surface is observed and the gel content is determined, as in Example 1.

TABLE 5

|  | This invention | | | | | | Control | | | | |
| --- | --- | --- | --- | --- | --- | --- | --- | --- | --- | --- | --- |
|  | run 1 | run 2 | run 3 | run 4 | run 5 | run 6 | run 7 | run 8 | run 9 | run 10 | run 11 |
| Low density polyethylene (parts) | 100 | 99 | 97 | 95 | 90 | 85 | 80 | 70 | 60 | 50 | 40 |
| High density polyethylene (parts) | — | 1 | 3 | 5 | 10 | 15 | 20 | 30 | 40 | 50 | 60 |
| Melt index of polyethylene mixture (g/10 min.) | 0.2 | 0.207 | 0.221 | 0.235 | 0.270 | 0.305 | 0.340 | 0.410 | 0.480 | 0.550 | 0.620 |
| VTMOS (parts) | 4 | 4 | 4 | 4 | 4 | 4 | 4 | 4 | 4 | 4 | 4 |
| DCP (parts) | 0.3 | 0.3 | 0.3 | 0.3 | 0.3 | 0.3 | 0.3 | 0.3 | 0.3 | 0.3 | 0.3 |
| DBTDL (parts) | 0.25 | 0.25 | 0.25 | 0.25 | 0.25 | 0.25 | 0.25 | 0.25 | 0.25 | 0.25 | 0.25 |
| Surface of extrudate | good | good | good | good | good | good | poor | poor | poor | poor | poor |
| Gel content (%) | 76.3 | 77.1 | 77.8 | 78.4 | 79.0 | 79.9 | 80.1 | 80.7 | 80.8 | 80.6 | 80.9 |

Table 5 demonstrates that an amount less than 85% by weight of the low density polyethylene brings about a poor surface of the extrudate.

EXAMPLE 6

The procedure as Example 1 is repeated with the sole difference being that the starting materials are polyethylene mixtures consisting of a low density polyethylene having a density of 0.919 and a melt index of 0.2 g/10 min. and a high density polyethylene having a density of 0.968 and a melt index of 5.5 g/10 min. A covered electrical wire is made as in Example 1 and the surface is observed. The gel content of the insulation is determined.

TABLE 6

|  | This invention | | | | Control | |
|---|---|---|---|---|---|---|
|  | run 1 | run 2 | run 3 | run 4 | run 5 | run 6 |
| Low density polyethylene (parts) | 100 | 99 | 97 | 95 | 93 | 90 |
| High density polyethylene (parts) | — | 1 | 3 | 5 | 7 | 10 |
| Melt index of polyethyle mixture (g/10 min.) | 0.2 | 0.253 | 0.359 | 0.465 | 0.571 | 0.730 |
| VTMOS (parts) | 4 | 4 | 4 | 4 | 4 | 4 |
| DCP (parts) | 0.3 | 0.3 | 0.3 | 0.3 | 0.3 | 0.3 |
| DBTDL (parts) | 0.25 | 0.25 | 0.25 | 0.25 | 0.25 | 0.25 |
| Surface of extrudate | good | good | good | good | poor | poor |
| Gel content (%) | 76.3 | 78.7 | 80.2 | 80.5 | 80.6 | 80.8 |

It is ascertained by Table 6 above that the surface of the extrudate becomes poor as the melt index of the polyethylene mixture exceeds 0.5 g/10 min., even although the content of the low density polyethylene is more than 85% by weight.

EXAMPLE 7

The procedure of Example 1 is repeated with the sole difference being that polyolefin mixtures consisting of a low density polyethylene having a density of 0.919 and a melt index of 0.2 g/10 min. and a polypropylene having a density of 0.90 and a melt index of 0.9 g/10 min. are employed as starting material. A covered electrical wire is made as in Example 1 and the surface is observed. The gel content of the insulation also is determined.

TABLE 7

|  | This invention | | | | | Control | | |
|---|---|---|---|---|---|---|---|---|
|  | run 1 | run 2 | run 3 | run 4 | run 5 | run 6 | run 7 | run 8 |
| Low density polyethylene (parts) | 100 | 99 | 95 | 90 | 85 | 80 | 60 | 40 |
| Polypropylene (parts) | 0 | 1 | 5 | 10 | 15 | 20 | 40 | 60 |
| Melt index of polyolefin mixture (g/10 min.) | 0.2 | 0.207 | 0.235 | 0.270 | 0.305 | 0.340 | 0.480 | 0.620 |
| VTMOS (parts) | 4 | 4 | 4 | 4 | 4 | 4 | 4 | 4 |
| DCP (parts) | 0.3 | 0.3 | 0.3 | 0.3 | 0.3 | 0.3 | 0.3 | 0.3 |
| DBTDL (parts) | 0.25 | 0.25 | 0.25 | 0.25 | 0.25 | 0.25 | 0.25 | 0.25 |
| Surface of extrudate | good | good | good | good | good | poor | poor | poor |
| Gel content (%) | 76.3 | 89.3 | 90.3 | 92.5 | 94.8 | 96.4 | 96.9 | 97.5 |

As can be seen from Table 7 above, an amount less than 85% by weight of a low density polyethylene increases the gel content of the product but makes the surface of the product rough. When an amount not more than 15 parts by weight of a polypropylene is added to a low density polyethylene, the obtained product has a high gel content and an improved surface.

EXAMPLE 8

A solution of 0.1 parts by weight of DCP dissolved in 4 parts by weight of VTMOS is dispersed into 100 parts by weight of a polyethylene mixture which has been prepared by milling a low density polyethylene having a density of 0.917 and a melt index of 2.0 g/10 min. with a high density polyethylene having a density of 0.957 and a melt index of 7.0 g/10 min. The resulting mix is extruded at an extrusion temperature of 200° C. to form a crosslinkable silane-graft polyethylene, by means of an extruder provided with a 50 mm screw.

95 parts by weight of the obtained silane-grafted polyethylene are mixed with 5 parts by weight of a low density polyethylene containing 1% by weight of dibutyl-tin dilaurate, and the resulting mixture is extruded at a temperature of 170°–180° C. to form an insulation on an electrical wire. The surface of the covered wire is observed. The gel content of the insulation is determined by dissolving a part of the insulation in xylene at 120° C. taking 24 hours. The results are set forth in Table 8 below.

TABLE 8

|  | Control | | | | This invention | | | | | |
|---|---|---|---|---|---|---|---|---|---|---|
|  | run 1 | run 2 | run 3 | run 4 | run 5 | run 6 | run 7 | run 8 | run 9 | run 10 |
| Low density polyethylene (parts) | 100 | — | 99.5 | 45 | 50 | 60 | 70 | 80 | 90 | 99 |
| High density polyethylene (parts) | — | 100 | 0.5 | 55 | 50 | 40 | 30 | 20 | 10 | 1 |
| VTMOS (parts) | 4 | 4 | 4 | 4 | 4 | 4 | 4 | 4 | 4 | 4 |
| DCP (parts) | 0.1 | 0.1 | 0.1 | 0.1 | 0.1 | 0.1 | 0.1 | 0.1 | 0.1 | 0.1 |
| Surface of extrudate | good | poor | good | poor | good | good | good | good | good | good |
| Gel content (%) | 50.2 | 78.3 | 65.3 | 75.1 | 74.8 | 74.3 | 73.1 | 72.4 | 71.6 | 70.3 |

A test is run as control. A low density polyethylene having a density of 0.917 and a melt index of 2.0 g/10 min., which contains about 2% of DCP, is extruded at an extrusion temperature of 170°–180° C. to form an insulation onto an electrical wire. Although the gel content of the extrudate is determined to be 72.8%, the surface of the extrudate is observed to be remarkably rough, as compared with that of the extrudate according to this invention.

In accordance with the method of this invention, a polyethylene or a polyolefin mixture, which has a limited density and a limited melt index, is reacted with a limited amount of an organic silane and a free radical generating compound to form a silane-grafted polyolefin, and furthermore, the silane-grafted polyolefin is reacted with a silanol condensation catalyst on a limited quantity, as elucidated by the detailed illustration hereinbefore. By virtue of these steps, the polyolefin can be sufficiently crosslinked merely by extruding, without exposing the material to moisture, as contrasted with the prior art. In addition, the necessary fluidity is maintained in spite of a high degree of crosslinking. Moreover, the method this invention has the advantage of permitting the production of a crosslinked polyolefin article with smooth surface.

What is claimed is:

1. A method for producing a crosslinked polyolefin comprising reacting a polyolefin which is a low density polyethylene having a density less than 0.93 and a melt index of 0.1 to 0.5 g/10 min. or a polyolefin mixture containing a low density polyethylene having a density less than 0.93 as major component, with a free radical generating compound and an organic silane having the general formula $RR'SiY_2$, wherein R represents a monovalent olefinically unsaturated hydrocarbon or hydrocarbonoxy radical, each Y represents a hydrolyzable organic radical, and R' represents a monovalent hydrocarbon radical with the exception of aliphatically unsaturated hydrocarbon radicals, or a Y radical, to form a silane-grafted polyolefin, then mixing said silane-grafted polyolefin with a silanol condensation catalyst, and heating the mixture in the absence of water.

2. A method for producing a crosslinked polyolefin comprising reacting a polyolefin which is a low density polyethylene having a density less than 0.93 and a melt index of 0.1 to 0.5 g/10 min., or a polyolefin mixture having a melt index of 0.1 to 0.5 g/10 min. and consisting of a low density polyethylene having a density less than 0.93, polyproplyene or a high density polyethylene in an amount of not more than 15% by weight based on the total weight of the polyolefin mixture, with a free radical generating compound and an organic silane having the general formula $RR'SiY_2$, wherein R represents a monovalent olefinically unsaturated hydrocarbon or hydrocarbonoxy radical, each Y represents a hydrolyzable organic radical, and R' represents a monovalent hydrocarbon radical except aliphatically unsaturated hydrocarbon radicals, or a Y radical, to form a silane-grafted polyolefin, then mixing said silane-grafted polyolefin with a silanol condensation catalyst, and heating the mixture in the absence of water.

3. A method as described in claim 2 wherein said organic silane is vinyltrimethoxysilane or vinyltriethoxysilane, and the organic silane is employed in an amount of 1–10 parts by weight per 100 parts by weight of said polyolefin.

4. A method as described in claim 2 wherein said free radical generating compound has a half-life of not more than 6 minutes at a temperature of 140° C. or more, and the free radical generating compound is employed in an amount of from 0.0002 to 0.002 moles per 100 g of said polyolefin.

5. A method as described in claim 2 wherein said silanol condensation catalyst is an organometallic compound, and the silanol condensation catalyst is used in an amount of 0.05 to 0.5 parts by weight per 100 parts by weight of said silane-grafted polyolefin.

6. A method for producing a crosslinked polyethylene comprising reacting a polyethylene mixture consisting of a low density polyethylene having a density less than 0.93 in an amount of 50 to 99% by weight and a high density polyethylene having a density not less than 0.93 in an amount of 50 to 1% by weight, with a free radical generating compound and an organic silane having the general formula $RR'SiY_2$, wherein R represents a monovalent olefinically unsaturated hydrocarbon or hydrocarbonoxy radical, each Y represents a hydrolyzable organic radical, and R' represents a monovalent hydrocarbon radical with the exception of aliphatically unsaturated hydrocarbon radicals, or a Y radical, to form a silane-grafted polyethylene, then mixing said silane-grafted polyethylene with a silanol condensation catalyst, and heating in the absence of water.

7. A method as described in claim 6 wherein said organic silane is vinyltrimethoxysilane, or vinyltriethoxysilane, and the organic silane is employed in an amount of 1 to 10 parts by weight per 100 parts by weight of said polyethylene mixture.

8. A method as described in claim 6 wherein said free radical generating compound has a half-life of not more than 6 minutes at a temperature of 140° C. or more, and the free radical generating compound is employed in an amount of from 0.0002 to 0.002 moles per 100 g of said polyethylene mixture.

9. A method as described in claim 6 wherein said silanol condensation catalyst is an organometallic compound, and the silanol condensation catalyst is used in an amount of 0.05 to 0.5 parts by weight per 100 parts by weight of said silane-grafted polyethylene.

* * * * *

UNITED STATES PATENT OFFICE
CERTIFICATE OF CORRECTION

Patent No. 4,228,255          Dated Oct. 14, 1980

Inventor(s) Ikuo Fujimoto, et al

It is certified that error appears in the above-identified patent and that said Letters Patent are hereby corrected as shown below:

In the heading of the Patent [30] should read as follows:

[30] Foreign Application Priority Data:

Dec. 14, 1976    [JP] Japan............51-150190

July 12, 1977    [JP] Japan............52-83206

Signed and Sealed this

Sixth Day of January 1981

[SEAL]

Attest:

SIDNEY A. DIAMOND

Attesting Officer      Commissioner of Patents and Trademarks